United States Patent
Katsuda et al.

(10) Patent No.: US 7,752,267 B2
(45) Date of Patent: Jul. 6, 2010

(54) DEVICE, METHOD AND PROGRAM PRODUCT FOR DATA TRANSMISSION MANAGEMENT

(75) Inventors: Takeo Katsuda, Tokyo (JP); Tsutomu Yamazaki, Odawara (JP)

(73) Assignee: Minolta Co., Ltd., Osaka (JP)

( * ) Notice: Subject to any disclaimer, the term of this patent is extended or adjusted under 35 U.S.C. 154(b) by 1246 days.

(21) Appl. No.: 10/095,536

(22) Filed: Mar. 13, 2002

(65) Prior Publication Data

US 2003/0046352 A1 Mar. 6, 2003

(30) Foreign Application Priority Data

Mar. 13, 2001 (JP) ............................. 2001-070882

(51) Int. Cl.
*G06F 15/16* (2006.01)
(52) U.S. Cl. ...................................................... 709/206
(58) Field of Classification Search ................. 709/217, 709/206; 707/8; 706/21; 382/100, 165; 358/1.2, 403, 1.15
See application file for complete search history.

(56) References Cited

U.S. PATENT DOCUMENTS

| | | | | |
|---|---|---|---|---|
| 4,603,431 A | * | 7/1986 | Grover et al. ............... | 382/241 |
| 5,168,376 A | * | 12/1992 | Motohama ................... | 358/437 |
| 5,434,920 A | * | 7/1995 | Cox et al. .................... | 380/257 |
| 5,760,917 A | * | 6/1998 | Sheridan ...................... | 358/442 |
| 5,790,790 A | | 8/1998 | Smith et al. | |
| 5,995,942 A | * | 11/1999 | Smith et al. .................... | 705/14 |
| 6,011,857 A | * | 1/2000 | Sowell et al. ................ | 382/100 |
| 6,049,821 A | * | 4/2000 | Theriault et al. ............. | 709/203 |
| 6,119,137 A | | 9/2000 | Smith et al. | |
| 6,188,787 B1 | * | 2/2001 | Ohmae et al. ................ | 382/165 |
| 6,230,268 B1 | * | 5/2001 | Miwa et al. .................. | 713/176 |
| 6,260,040 B1 | * | 7/2001 | Kauffman et al. ............. | 707/10 |
| 6,263,438 B1 | * | 7/2001 | Walker et al. ................ | 713/178 |
| 6,298,405 B1 | * | 10/2001 | Ito et al. ...................... | 710/107 |
| 6,317,219 B1 | * | 11/2001 | Kim ............................ | 358/1.2 |
| 6,339,424 B1 | * | 1/2002 | Ishikawa et al. ............. | 345/419 |
| 6,363,414 B1 | * | 3/2002 | Nicholls et al. .............. | 709/206 |
| 6,424,429 B1 | * | 7/2002 | Takahashi et al. ........... | 358/1.16 |
| 6,434,619 B1 | * | 8/2002 | Lim et al. .................... | 709/229 |
| 6,442,549 B1 | * | 8/2002 | Schneider .................... | 707/10 |
| 6,507,415 B1 | * | 1/2003 | Toyoda et al. ............... | 358/450 |
| 6,519,576 B1 | * | 2/2003 | Freeman ...................... | 706/21 |

(Continued)

FOREIGN PATENT DOCUMENTS

JP 09017127 A * 1/1997

(Continued)

*Primary Examiner*—Asad M Nawaz
*Assistant Examiner*—Jason Recek
(74) *Attorney, Agent, or Firm*—Morrison & Foerster LLP (57) ABSTRACT

A scanner capable of functioning as a data transmission management device that makes a determination as to whether data should be allowed to be reused at a file transmission destination based on the nature of the particular destination, produces a reusable file, and transmits it to the destination, if it determines that the reuse of the data is allowed because the destination is within the area of the first network N1 to which the scanner is connected; or it produces difficult-to-reuse file and transmits it to the destination, if it determines that the reuse of the data is disallowed because the destination is outside of the area of the first network N1.

18 Claims, 11 Drawing Sheets

U.S. PATENT DOCUMENTS

| | | | |
|---|---|---|---|
| 6,557,030 B1 * | 4/2003 | Hoang | 709/217 |
| 6,598,057 B1 * | 7/2003 | Synnestvedt et al. | 707/200 |
| 6,643,684 B1 * | 11/2003 | Malkin et al. | 709/206 |
| 6,801,340 B1 * | 10/2004 | Endo | 358/403 |
| 6,952,279 B1 * | 10/2005 | Iida | 358/1.15 |
| 6,981,023 B1 * | 12/2005 | Hamilton et al. | 709/206 |
| 7,020,772 B2 * | 3/2006 | England et al. | 713/166 |
| 7,043,524 B2 * | 5/2006 | Shah et al. | 709/203 |
| 7,116,433 B1 * | 10/2006 | Toyoda | 358/1.15 |
| 7,120,254 B2 * | 10/2006 | Glick et al. | 380/258 |
| RE39,458 E * | 1/2007 | Pyne | 710/10 |
| 2002/0067858 A1 * | 6/2002 | Lazaridis | 382/228 |
| 2002/0077985 A1 * | 6/2002 | Kobata et al. | 705/51 |
| 2002/0082997 A1 * | 6/2002 | Kobata et al. | 705/51 |
| 2003/0163529 A1 * | 8/2003 | Yamaguchi | 709/206 |
| 2006/0031551 A1 * | 2/2006 | Agresta et al. | 709/231 |

FOREIGN PATENT DOCUMENTS

| | | | |
|---|---|---|---|
| JP | 11231731 A | * | 8/1999 |
| JP | 2000236413 A | * | 8/2000 |

* cited by examiner

DEVICE, METHOD AND PROGRAM PRODUCT FOR DATA TRANSMISSION MANAGEMENT

This application is based on Japanese Patent Application No. 2001-70882 filed on Mar. 13, 2001, the contents of which are hereby incorporated by reference.

BACKGROUND OF THE INVENTION

1. Field of the Invention

The present invention relates to a device, a method and a program product for managing data transmission conducted via networks.

2. Description of the Related Art

Files for document display, PDF (Portable Document Format) files, files which include character code data that express characters as codes, image data files that express images as an assembly of pixels, and vector data files that express graphics as coordinates of components, each of which are objects that can be handled independently, are well known.

Files that consist of these objects have advantages in that they can be easily edited and retrieved using character code data, the quality of their output image is high, and the total information of an original document can be maintained.

Consequently, files containing multiple objects can also be reused, e.g., edited, altered, modified, and retrieved at transmission destinations when they are transmitted to other equipment through networks.

This causes a problem in that these files are vulnerable to fraudulent reuses and/or reuses against the will of the data producer at arbitrary transmission destinations, such as devices located outside of the network to which the sender's equipment is connected.

SUMMARY OF THE INVENTION

Various embodiments of the invention include a device, a method, and a program product for data transmission management, which solve the abovementioned problems.

Further embodiments of the invention include a device, a method, and a program product for data transmission management capable of preventing the reuse of data either fraudulently and/or against the will of the data producer, at destinations of data transmission.

According to an aspect of the invention, a data transmission management device is provided for managing a data transmission process via a network comprising: an input device for inputting data to be transmitted; a judgment unit for judging whether reuse of data at a transmission destination should be approved in accordance with the nature of the particular destination of the data; and a data adjusting unit for adjusting the data to be transmitted to the destination based on the result of the judgment either to be reusable or to be difficult-to-reuse.

Therefore, an embodiment of the invention is capable of preventing the data from fraudulent reuses and/or from reuses against the will of the data producer (e.g., edited, altered, modified, and retrieved), at transmission destinations when data is transmitted to arbitrary destinations such as devices located outside of the network to which the data transmitting source is connected.

According to another aspect of the invention, a data transmission management method is provided for managing a data transmission process via a network comprising: obtaining data to be transmitted; judging whether reuse of data at a transmission destination should be approved in accordance with the nature of the particular destination of the data; and adjusting the data to be transmitted to the destination based on the result of the judgment either to be reusable or to be difficult-to-reuse.

According to still another aspect of the invention, a program product for managing data transmission process via a network is provided, wherein the program product causes a computer to execute a process comprising: obtaining data to be transmitted; judging whether reuse of data at a transmission destination should be approved in accordance with the nature of the particular destination of the data; and adjusting the data to be transmitted to the destination based on the result of the judgment either to be reusable or to be difficult-to-reuse.

According to still another aspect of the invention, a data transmission management method is provided for managing data transmission process via a network comprising: obtaining data to be transmitted; judging whether the data's transmission destination exists within a specified range of a network to which the destination belongs; and producing data to be transmitted to the destination, wherein the data is either data consisting of multiple kinds of codes, or data consisting of a single kind of code based on the judgment result.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

Various embodiments of this invention will be described below with reference to the accompanying drawings.

Figure 1:
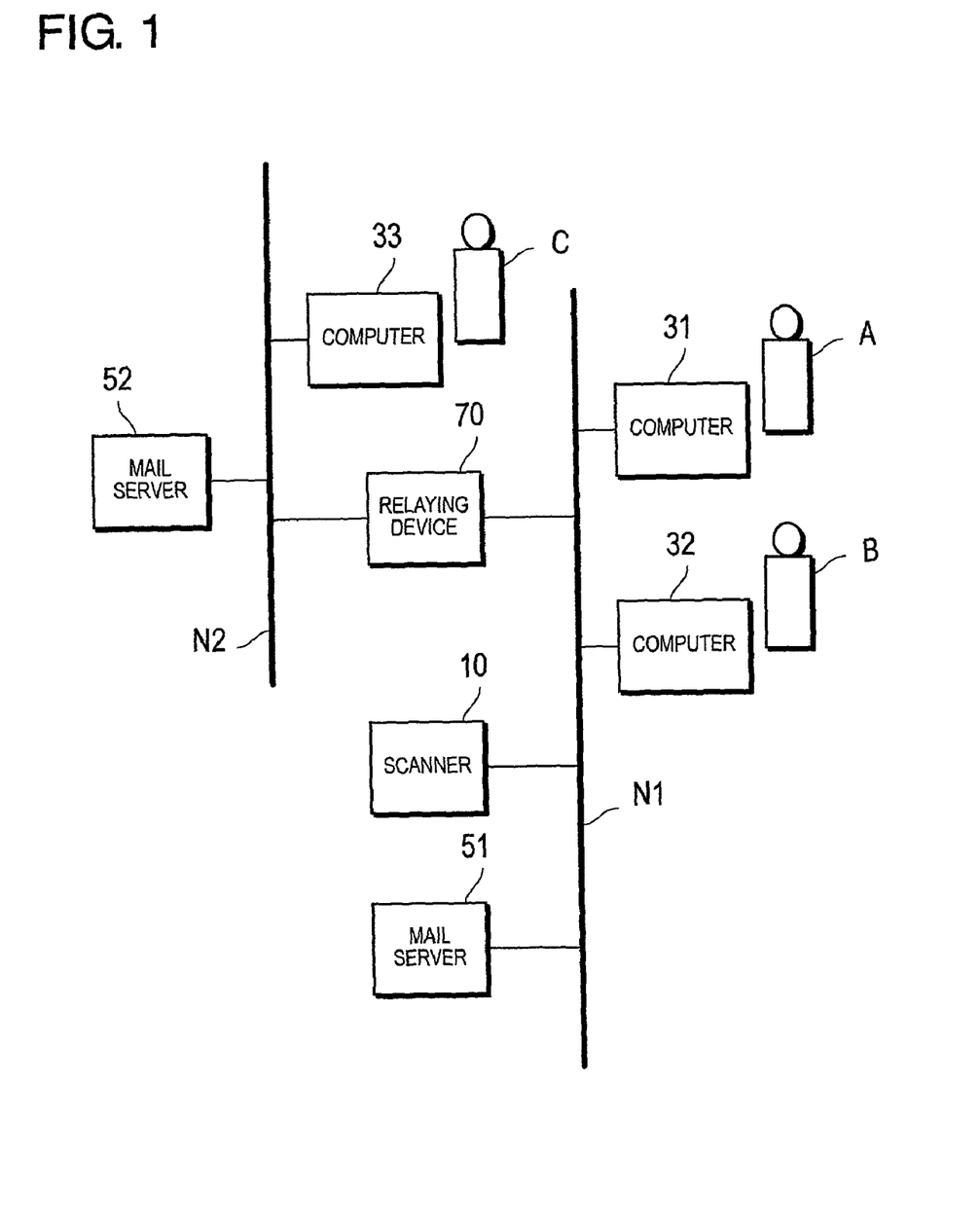
FIG. 1 is a diagram showing a data transmission system including a data transmission management device according to the first embodiment of the invention.

FIG. 1 is a diagram showing an example of a data transmission system including a data transmission management device according to the first embodiment of the present invention.

The data transmission system shown in FIG. 1 includes a scanner 10, which functions as a data transmission device, personal computers (hereinafter simply called "computers") 31 through 33, mail servers 51 and 52, and a relaying device 70.

The scanner 10, the computers 31 and 32, and the mail server 51 are connected to the first network N1, while the computer 33 and the mail server 52 are connected to the second network N2. The relaying device 70 connects the first network N1 and the second network N2 to each other. The user of the computer 31 is A, the user of the computer 32 is B, and the user of the computer 33 is C.

The scanner 10, the computers 31 through 33, and the mail servers 51 and 52 are provided in such a way as to be able to communicate with each other via the networks N1 and N2 as well as the relaying device 70. The image data file obtained by scanning a document using the scanner can be transmitted to the computers, etc., as an attachment to an electronic mail (e-mail). The number of networks, and the type and number of units and/or devices on the networks are not limited to those shown on FIG. 1.

The relaying device 70 is preferably a gateway capable of changing protocols. The networks N1 and N2 may be, for example, LANs such as Ethernet, Token Ring, and FDDI (fiber distributed data interface), or WANs consisting of interconnected LANs. The difference in protocols between the first and second networks, N1 and N2, is immaterial.

Example structures of these devices will be described below.

Figure 2:
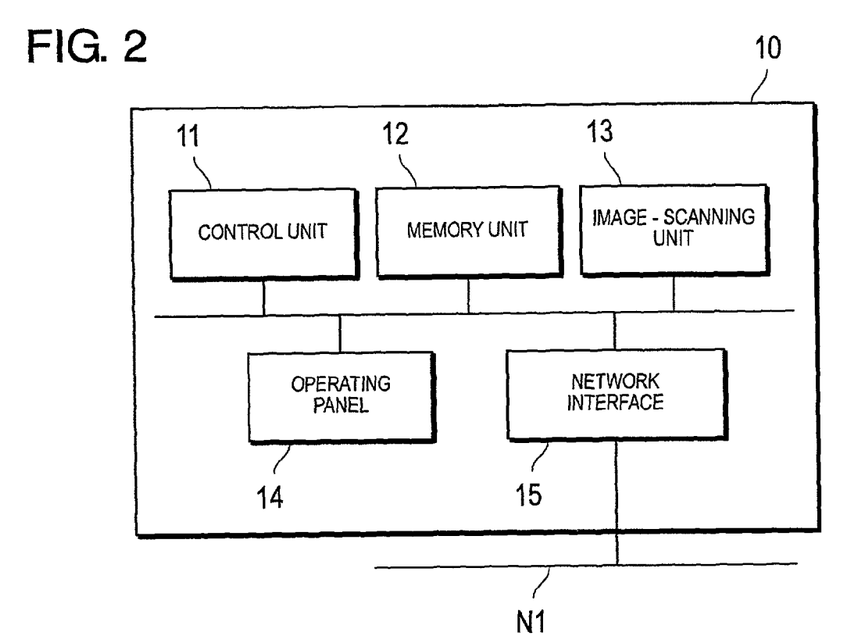
FIG. 2 is a block diagram showing an example of the scanner.

FIG. 2 is a block diagram showing an example of a scanner.

In FIG. 2, the scanner 10 has a control unit 11, a memory unit 12, an image-scanning unit 13, an operating panel 14, and a network interface 15.

The control unit 11 is in charge of executing the program, performing arithmetic operations, and controlling various units, etc. The memory unit 12 stores various programs for controlling processes such as document scanning and data transmission, as well as storing various data such as image data, wherein the data is stored temporarily as a working area for executing various processes. The memory unit 12 includes, for example, a stationary memory and a hard disk.

The image-scanning unit 13 obtains image data by scanning documents. Generally, the image data output from the image-scanning unit 13 is temporarily written into the memory and then transferred from the memory to the hard disk after completing one page of scanning to be stored.

The operating panel 14 includes, for example, an operating unit for the user to perform various operations and instructions, and a display unit for various displays.

The network interface 15 is an interface for the scanner 10 to communicate with other equipment via the first and second networks N1 and N2.

Figure 3:
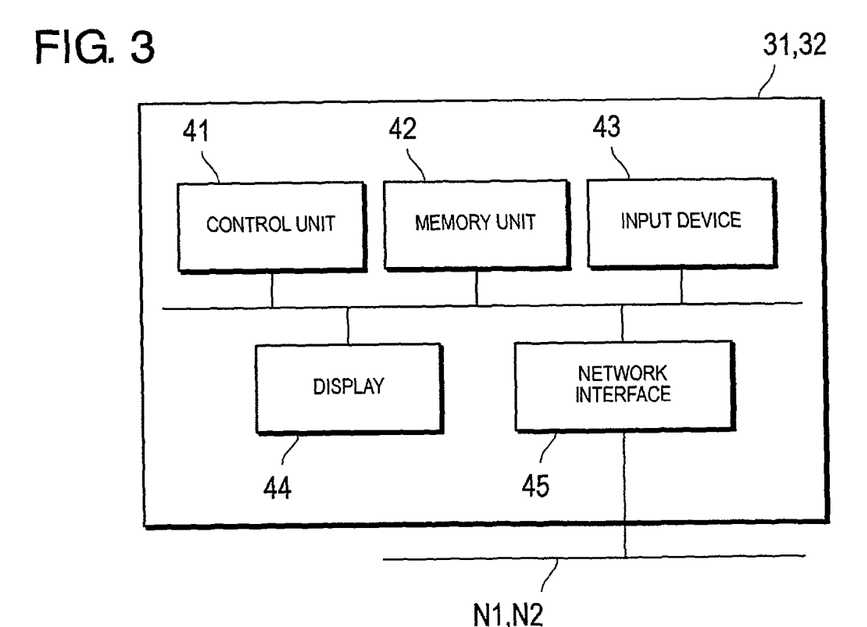
FIG. 3 is a block diagram showing an example of the computers.

FIG. 3 is a block diagram showing an example of the computers.

In FIG. 3, each of the computers 31 and 32 has a control unit 41, a memory unit 42, an input device 43, a display 44, and a network interface 45.

The control unit 41 is in charge of executing the program, performing arithmetic operations, and/or controlling various units, etc. The memory unit 42 stores various programs and various data such as image data, wherein the data is stored temporarily as a working area for executing various processes. The memory unit 42 includes, for example, a stationary memory and a hard disk.

The input device 43 allows the user to perform various operations and provide instructions. The input device typically includes a keyboard, a mouse, etc. The display 44 is for displaying information. The network interface 45 is an interface for the computers 31 and 32 to communicate with other equipment via the first and second networks N1 and N2.

Figure 4:
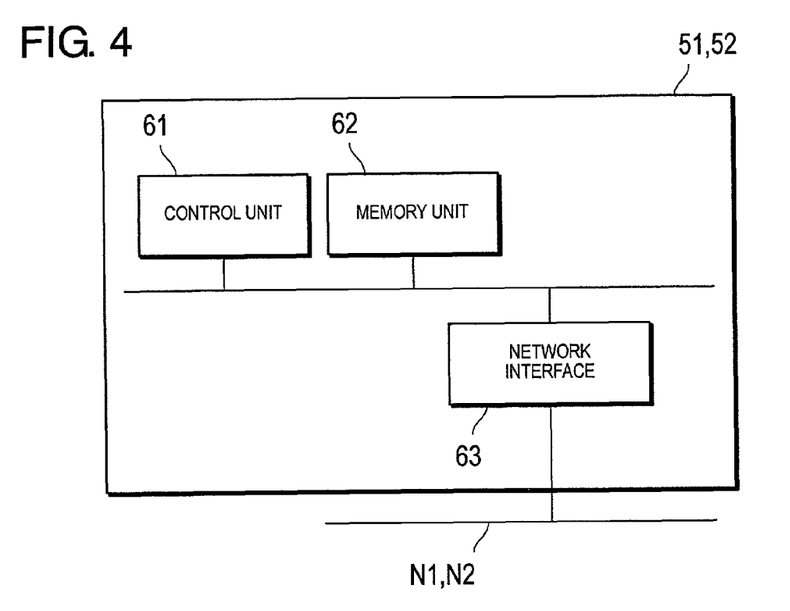
FIG. 4 is a block diagram showing an example of the mail servers.

FIG. 4 is a block diagram showing example mail servers.

In FIG. 4, each of the mail servers 51 and 52 has a control unit 61, a memory unit 62, and a network interface 63. Furthermore, the servers 51 and 52 can be equipped each with an input device and a display as well.

The control unit 61 is in charge of executing the program, performing arithmetic operations, and controlling various units, etc. The memory unit 62 stores various programs for controlling processes, such as sending and receiving e-mail via the networks, as well as storing various data such as image data, wherein the data is stored temporarily as a working area for executing various processes. The memory unit 62 includes, for example, a stationary memory and a hard disk. The memory unit 62 includes mailboxes respectively assigned to mail accounts for storing e-mail.

The network interface 63 is an interface for the mail servers 51 and 52 to communicate with other equipment via the first and second networks N1 and N2.

Figure 5:
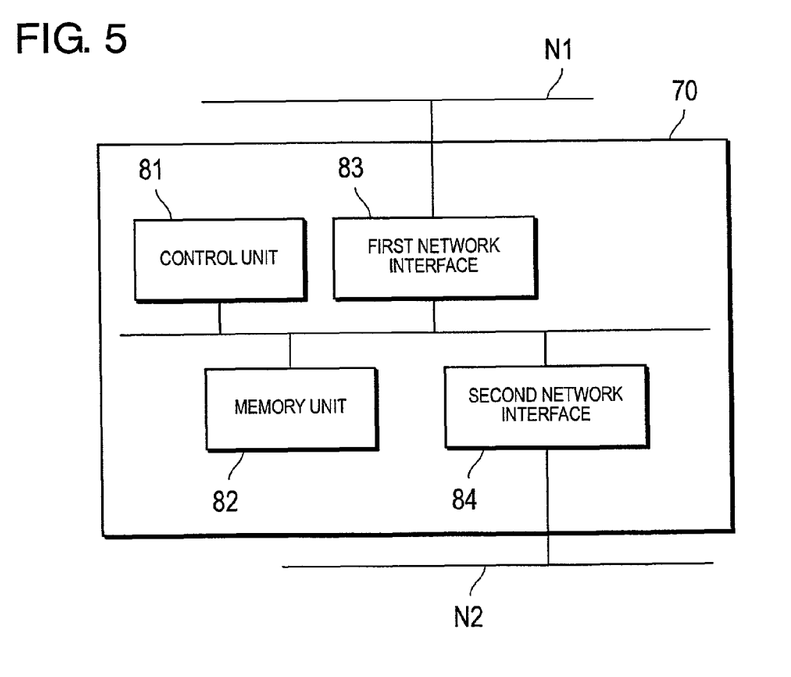
FIG. 5 is a block diagram showing an example of the relaying device.

FIG. 5 is a block diagram showing an example of a relaying device.

In FIG. 5, the relaying device 70 has a control unit 81, a memory unit 82, a first network interface 83, and a second network interface 84. Furthermore, the relaying device 70 can be equipped each with an input device and a display as well.

The control unit 81 is in charge of executing programs, performing arithmetic operations, and controlling various units, etc. The memory unit 82 stores various programs for controlling processes such as data transfer, as well as storing various data such as image data, wherein the data is stored temporarily as a working area for executing various processes. The memory unit 82 includes, for example, a stationary memory and a hard disk.

The first network interface 83 is for connecting the relaying device 70 with the first network N1. The second network interface 84 is for connecting the relaying device 70 with the second network N2.

Next, the operation of an example scanner 10 will be described with reference to FIG. 6 through FIG. 8. The flowcharts shown in FIG. 6 through FIG. 8 may be stored in the memory unit 12 of the scanner 10 as control programs, and may be executed by the control unit 11.

Figure 6:
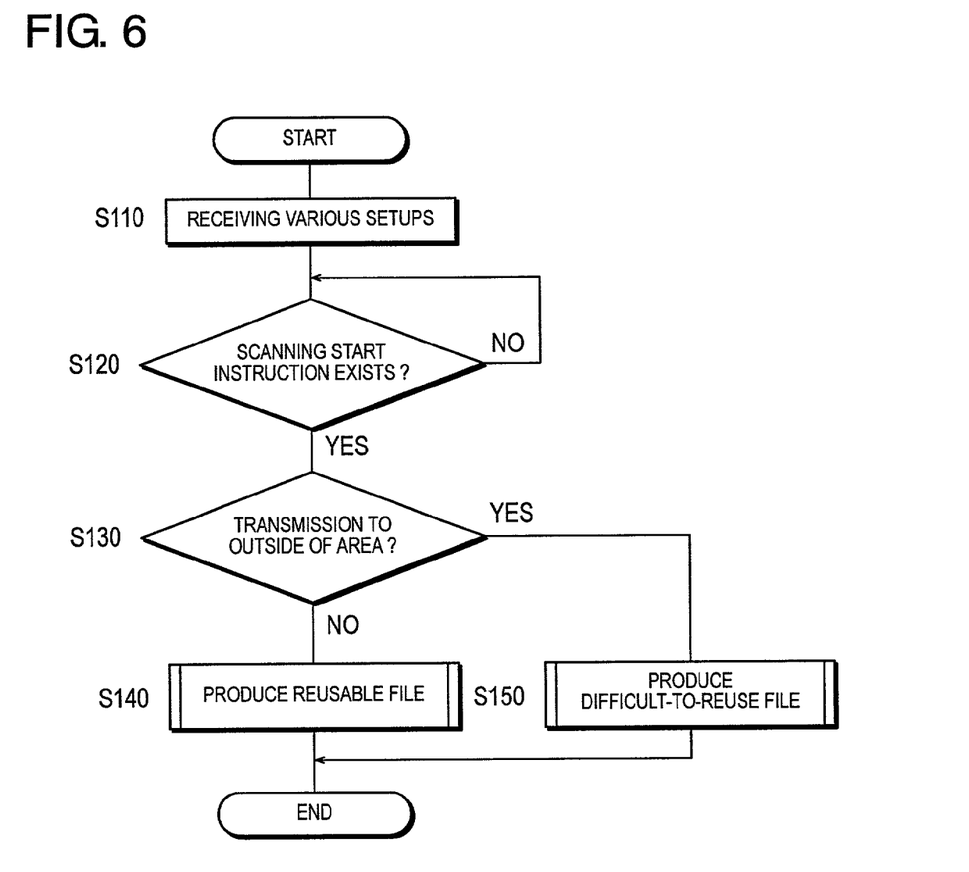
FIG. 6 is a flowchart describing the operation of the scanner.

As shown in FIG. 6, in step S110, the scanner 10 receives various setup inputs from the user via the operating panel 14. In other words, using the operating panel 14, the user can set various items such as scanning conditions for document scanning and scanning data information. The contents set up here may be stored into the memory unit 12.

The scanning conditions include scanning resolution, color/monochromatic selection, scaling factor, and scan size. The scanning data information includes a data transmission destination, a sender of the data, a file name for registration, a file's storage period, and a confidentiality level.

In S120, the scanner 10 stands by until a scanning start instruction is received from the user via the operating panel 14; upon receiving the scanning instruction, the process of S130 is executed.

In this embodiment, a judgment is made at S130, depending on the data transmission destination, as to whether reuse of the data at the transmission destination should be allowed. The judgment is based on whether the data transmission destination set up in S110 is outside the area of the first network N1 to which the scanner 10 is connected. In other words, the approval for the data's reuse depends upon whether the transmission destination is outside of its own network as viewed from the scanner 10.

If the transmission destination is within the first network N1, in other words, if it is either user A or user B (S130: No), the process of S140 is executed; if the transmission destination is outside of the first network N1, in other words, if it is user C (S130: Yes), the process of S150 is executed. The order of execution of S120 and S130 can be reversed. It is also possible to accept only the setup input of the data transmission destination in S110, and accept the input of other setup items after processing S130.

Figure 9:
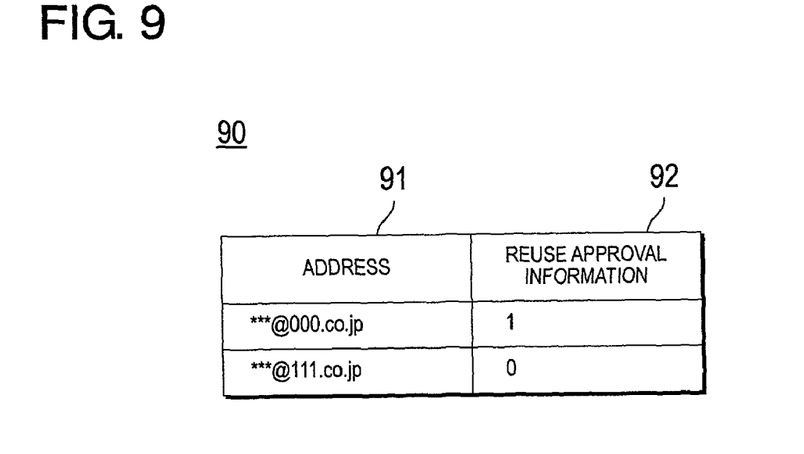
FIG. 9 shows an example area judgment table.

A judgment as to whether the destination is outside the area of the first network N1 can be made, for example, referencing the area judgment table shown in FIG. 9. The area judgment table 90 consists of an address column 91 and a reuse approval information column 92. A portion of the destination's e-mail address is set up in the address column 91. In the reuse approval column 92, a data "1" is set if the reuse is approved, or a data "0" is set if the reuse is disapproved. The manager may control the setup of each column of the area judgment table 90. In the example shown in FIG. 9, the destination is judged to be in the area of the first network N1 and the reuse of the data at the destination is approved if the e-mail address of the destination contains @000.co.jp. Also, the destination is judged to be outside of the area of the first network N1 and the reuse of the data at the destination is disapproved if the e-mail address of the destination contains @111.co.jp. In other words, if the domain names of the e-mail addresses of the sender and the receiver of the data match with each other, it is judged that the data reuse at the destination is approved. In the current case, the e-mail addresses of users A and B contain @000.co.jp, and the e-mail address of user C contains @111.co.jp.

The judgment as to whether reuse of the data at the destination is approved can be made not only using e-mail addresses, but also using various addresses such as IP addresses and MAC addresses, domain names, or various identification codes such as ID. Moreover, if IP addresses are to be used for judging whether reuse of the data at the destination is approved, this can be done, for example, by judging whether a portion of an IP address, or a portion of the IP address sectioned off at a certain position, is included. Thus it is possible to preset the approval of the data reuse based on company, division, floor, department, group, and/or individual equipment.

In S140, reusable files are produced. The production of reusable files will be described below with reference to FIG. 7.

Figure 7:
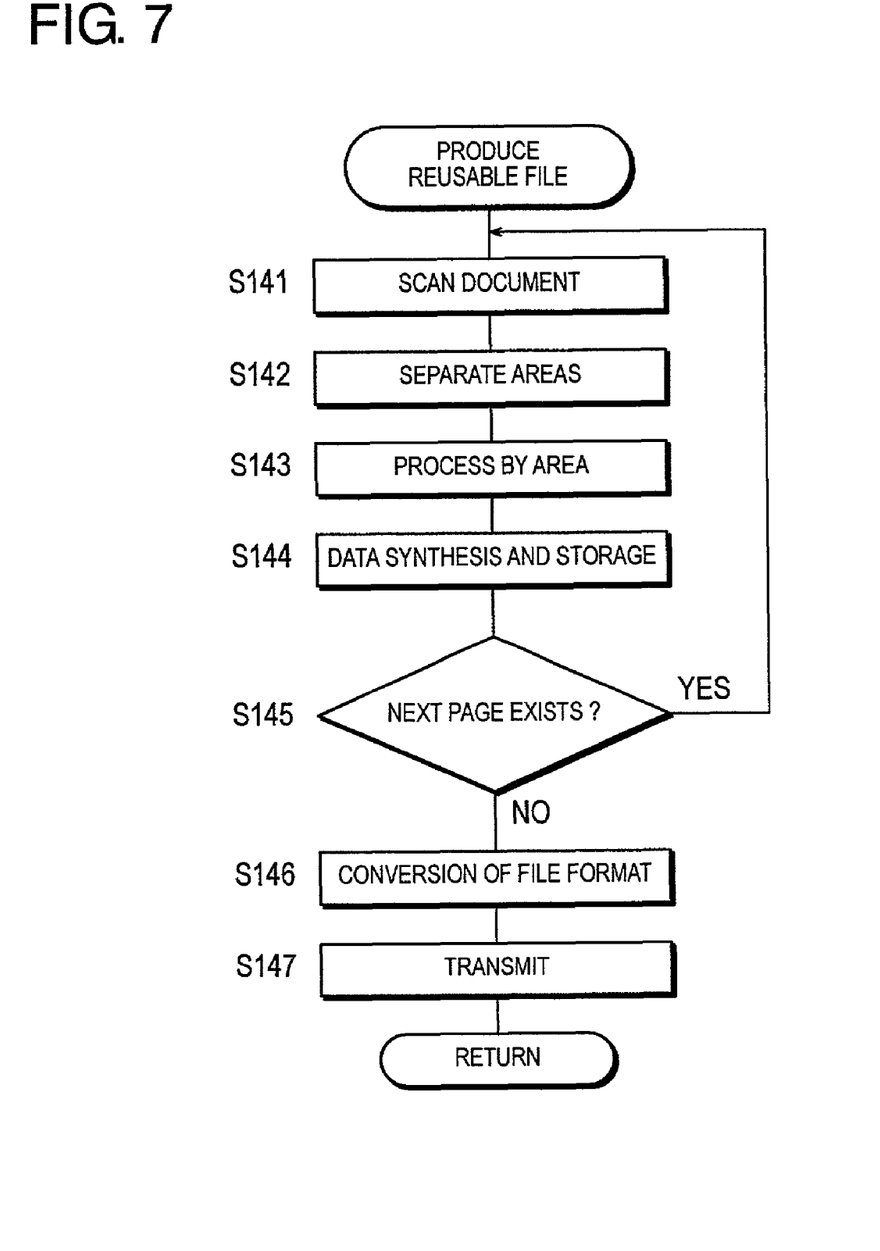
FIG. 7 is a flowchart describing the steps of producing a reusable file.
Figure 10:
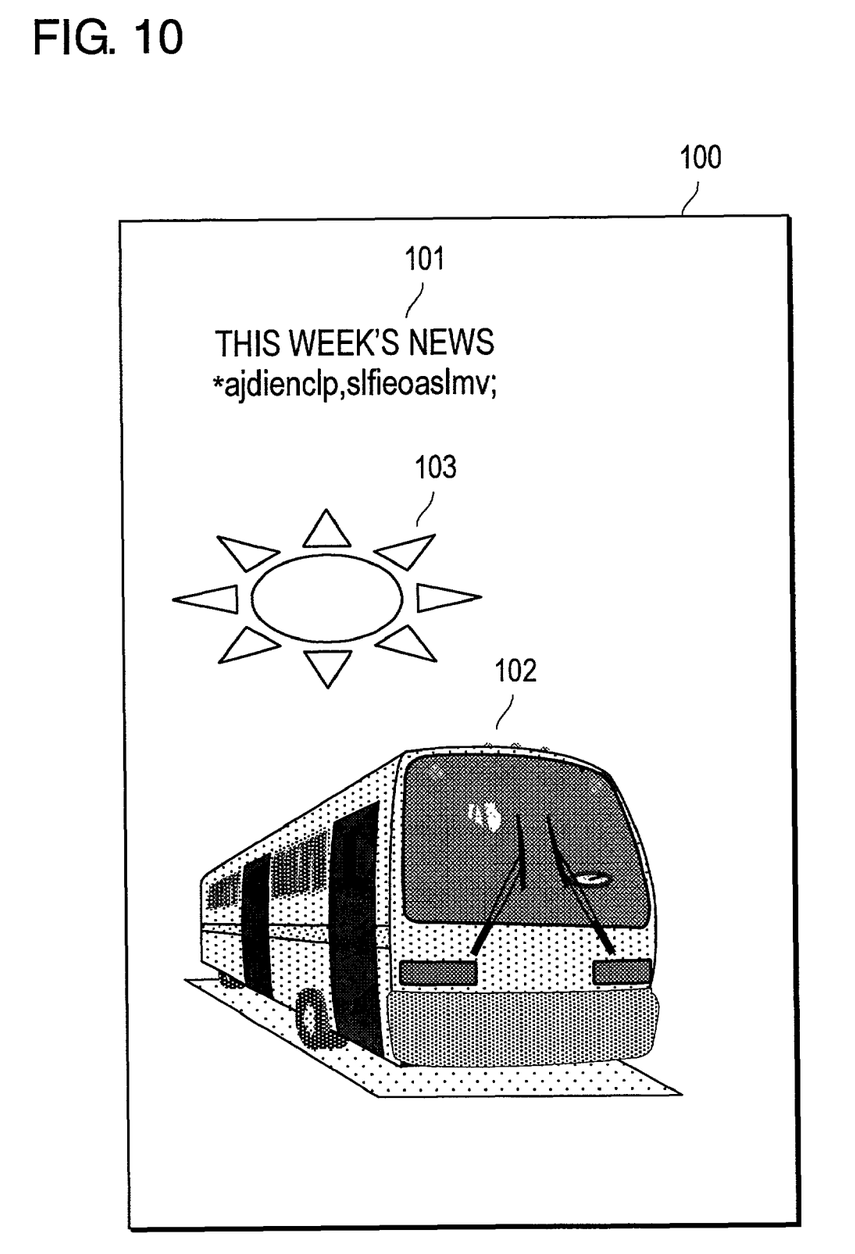
FIG. 10 shows an example document.

As shown in FIG. 7, document scanning is performed in S141. FIG. 10 shows an example document. The document 100 shown in FIG. 10 consists of a character section 101 where characters exist, a photograph section 102 where photographs exist, and a graphic section 103 where non-character graphics such as charts and graphs exist.

The scanning process starts when the user operates, for example, a start key of the operating panel 14. The image-scanning unit 13 scans the first page of the document set at the specified position of the scanner 10, consequently obtaining image data, which expresses images as an assembly of pixels. The obtained image data is stored in the memory unit 12.

In S142, an area separation process is performed on the obtained image. The image data is separated into a character area that corresponds to the character section 101 where character images exist, a photographic area that corresponds to the photograph section 102 where photographic images exist, and a graphic area that corresponds to the graphic section 103 where graphic images exist. Moreover, location information (layout information) that shows the location of each area on the output image, e.g., the coordinates of the left top corner and the right bottom corner of a rectangle that bounds each area, is detected in this process. Furthermore, an image correction process is performed for each area in accordance with its characteristics.

In S143, image processing for each area is performed respectively. In other words, character codes are recognized from character images within the character area, and character code data is generated that expresses characters as codes in response to the recognized characters. Photographic images in the photographic area are converted into image data of appropriate resolution and subjected to a compression process to generate photographic image data that expresses photographs as assemblies of pixels. The appropriate resolution here means relatively low resolution that dose not make the amount of data transmitted too large. The reason for converting only photographic images to appropriate resolution after area separation is because there are character images and graphic images that require higher resolution than photographic images in the document. Graphic images in the graphic area are converted into vector data that expresses graphics as the coordinates of their components.

In S144, the character code data, the photographic image data, and the vector data generated in S143 are synthesized and stored in the memory unit 12. Moreover, each data, layout information indicating the location of each data on the output image, and link information indicating the location of each data within the synthesized data are stored into the memory unit 12.

In S145, a judgment is made as to whether the next page of the document exists. If there is another page at the specified position of the scanner 10 (S145: Yes), it returns to S141 and repeats the processes of S141 through S145. If no document is left at the specified position of the scanner 10 (S145: No), the process of S146 is executed.

In S146, the data stored in the memory unit 12 is read and converted into a reusable file of a specified format. This reusable file is a file that contains character code data, image data, and/or vector data as objects that can be handled individually. Therefore, it is possible to reuse the file by performing editing, alteration, modification and/or retrieval. Moreover, although the file to be converted may be, for example, a PDF (portable document format) file, it is not limited to such and can be any existing file type such as an HTML (hypertext markup language) file, an XML (extensible markup language) file, and/or a file of a proprietary format.

Figure 11:
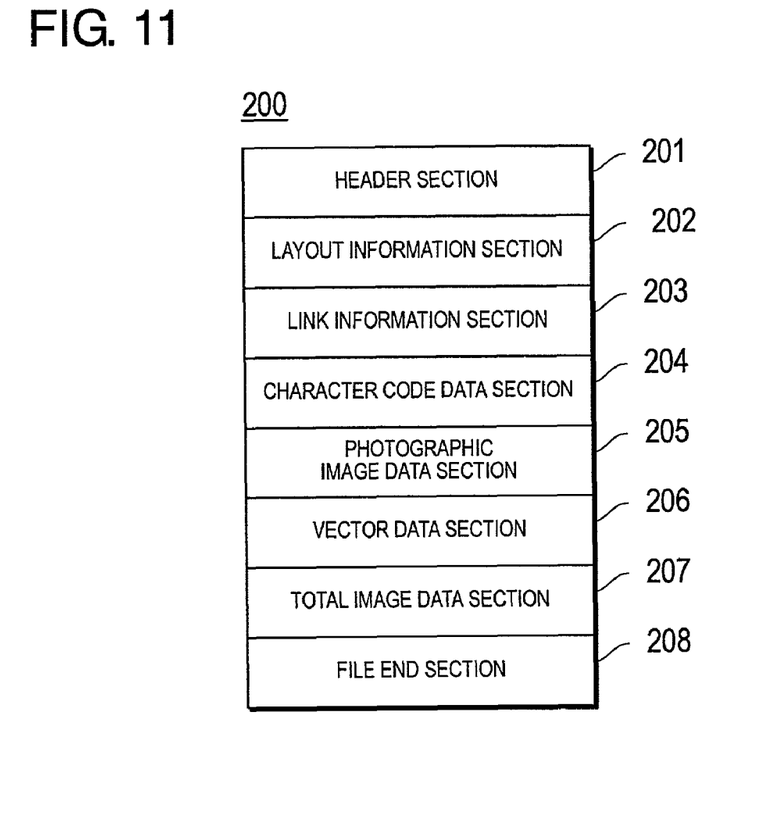
FIG. 11 shows an example reusable file.

FIG. 11 shows an example reusable file produced in S146. The reusable file 200 shown in FIG. 11 includes a header section 201, a layout information section 202, a link information section 203, a character code data section 204, a photographic image data section 205, a vector data section 206, a total image data section 207, and a file end section 208.

The header section 201 stores data such as the format and size (volume) of the particular file 200. The layout information section 202 stores layout information that shows the location of each object of character code data, photographic image data, and vector data on the output image. The link information section 203 stores link information that shows the location of each object within the file.

The character code data section 204, the photographic image data section 205, the vector data section 206, and the total image data section 207 store the character code data that corresponds to the character section 101, the photographic image data that corresponds to the photographic section 102, the vector data that corresponds to the graphic section 103, and the image data that corresponds to the entire document 100, respectively, when the document 100 shown in FIG. 10, for example, is scanned.

The reusable files according to one aspect of the invention may be, for example, files containing the data consisting only of character code data and total image data. In another example, the reusable files may be files containing data consisting only of character code data, or of character code data and vector data.

Figure 12:
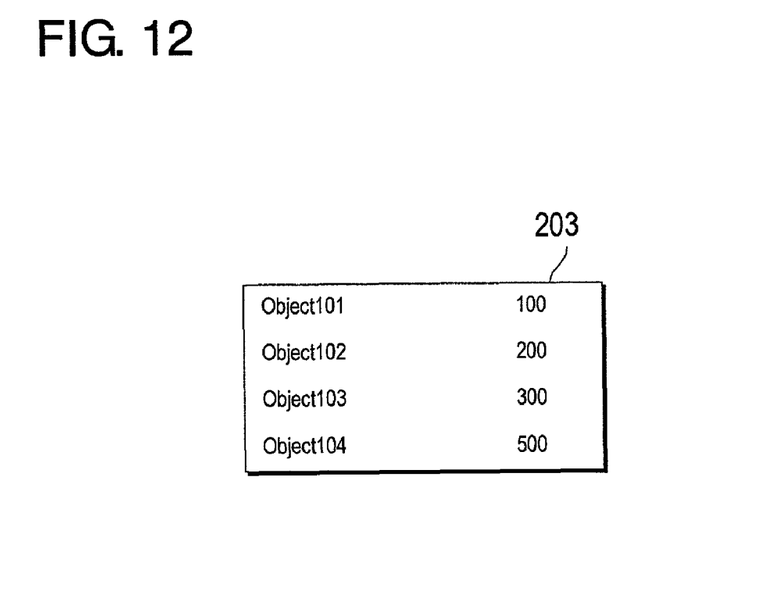
FIG. 12 shows an example of possible contents of the link information section.

FIG. 12 shows exemplary content of the link information section 203. In FIG. 12, "Object101" is a code that represents the character code data as an object, and shows that the object is stored starting from the $100^{th}$ address of the file. Similarly, "Object102," "Object103," and "Object104" are codes that represent the photographic image data, vector data, and total image data, respectively, as objects, and show that they are located starting from the $200^{th}$, $300^{th}$, and $400^{th}$ address of the file.

In S147, the reusable file 200 prepared at S146 is transmitted to the specified destination attached to an e-mail. The e-mail attached to the file is stored in the mailbox of the user according to the destination of the e-mail located in the memory unit 62 of the mail server 51. However, the file 200 can be transmitted to a specific destination according to a specified transfer protocol without relying on e-mail.

On the other hand, in S150 shown in FIG. 6, files that are difficult to reuse are prepared. The procedure for producing difficult-to-reuse files will be described with reference to FIG. 8.

Figure 8:
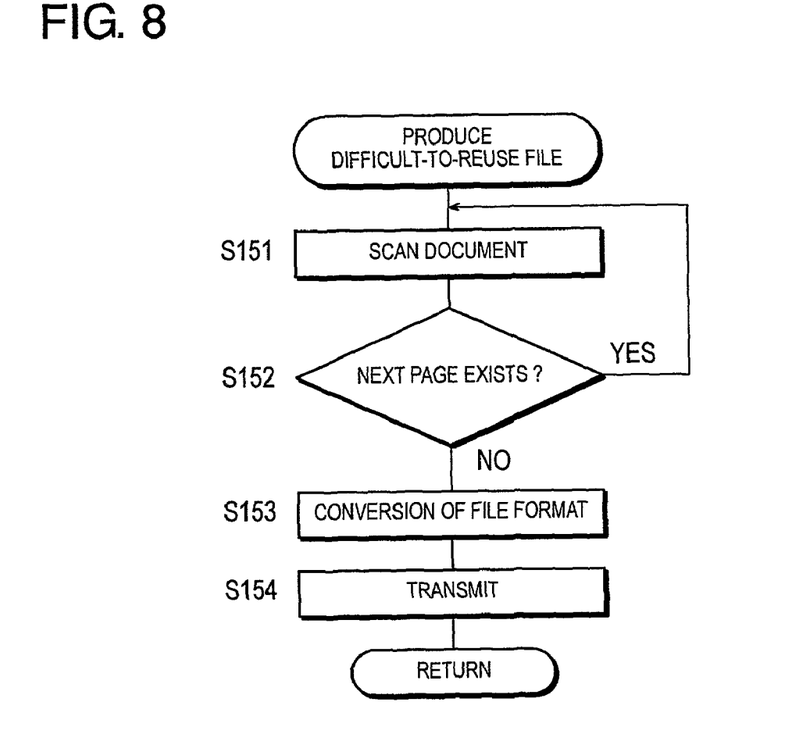
FIG. 8 is a flowchart describing the steps of producing a file that is difficult to reuse.

As shown in FIG. 8, the document scanning is done in S151 in a manner similar to that in S141 shown in FIG. 7. In other words, the document image may be obtained as the first page of the document set at the specified position of the scanner 10. The obtained image data is stored in the memory unit 12.

In S152, a judgment is made as to whether the next page of the document exists. If there is another page at the specified position of the scanner 10 (S152: Yes), it returns to S151 and repeats the document scanning process. If no document is left at the specified position of the scanner 10 (S152: No), the process of S153 is executed.

In S153, the data stored in the memory unit 12 in S151 is read out and converted into a difficult-to-reuse file of a specified format. According to an aspect of the invention, this difficult-to-reuse file is a file that contains data that consists only of image data that expresses images as an assembly of pixels. Therefore, it is difficult to reuse the file performing editing, alteration, modification and retrieval. Moreover, although the file to be converted may be, for example, a PDF file that does not contain any data other than image data, for example, character code data, it is not so limited, the file can be any existing file type such as a BMP (bitmap) file, a JPEG (joint photographic experts) file, or a file of a proprietary format.

Figure 13:
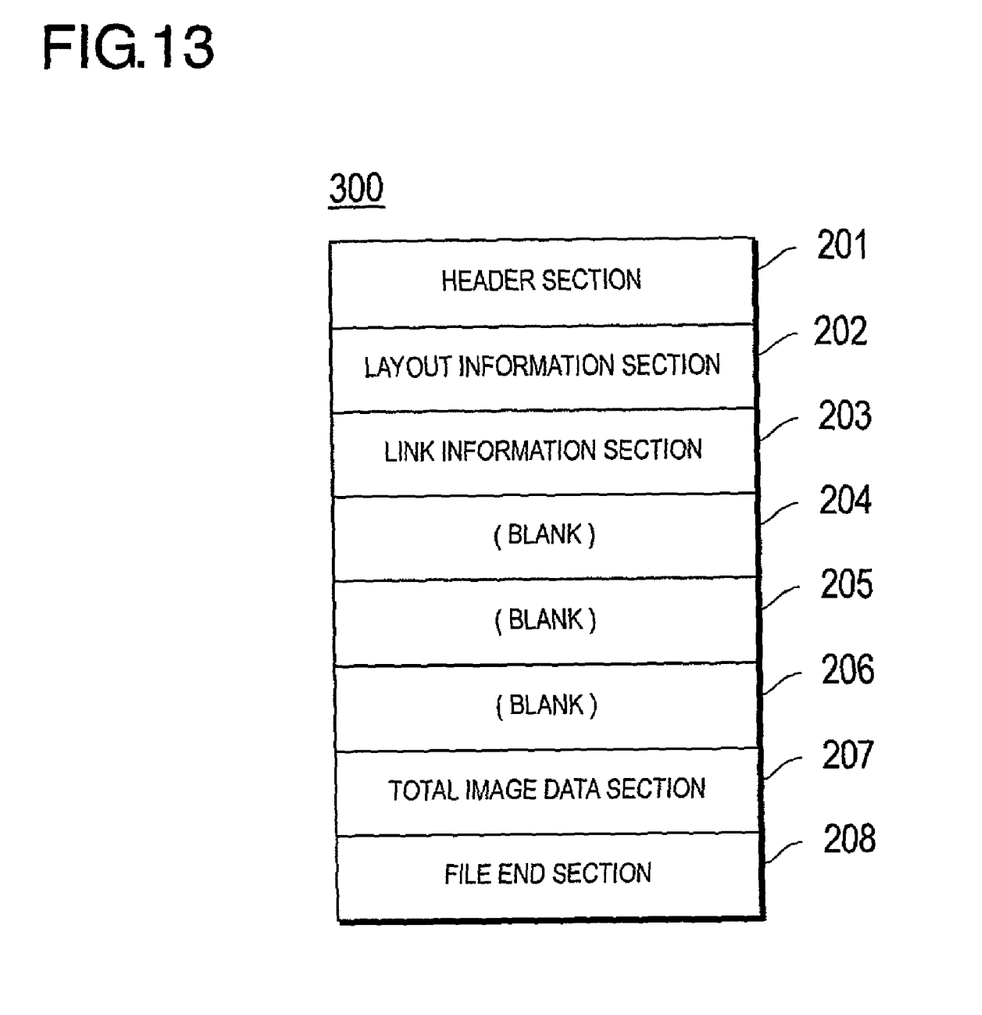
FIG. 13 shows an example file that is difficult to reuse.

FIG. 13 shows an example of such a difficult-to-reuse file prepared in S153. The difficult-to-reuse file 300 shown in FIG. 13 is different from the reusable file 200 shown in FIG. 11 in the sense that it stores no data in either the character code section 204, the photographic image data section 205, or the vector data section 206, but is substantially similar in other aspects such that its detail descriptions are omitted here.

In S154, the difficult-to-reuse file 300 prepared in S153 is transmitted to a specified destination attached to an e-mail. The e-mail message attached with the file is stored in the mailbox of the user, which according to the destination of the e-mail is located in the mail server 52. However, this file 300 can be transmitted to a specific destination according to a specified transfer protocol without relying on e-mail.

As can be seen from the above, scanner 10 according to this embodiment of the invention makes a judgment on whether to allow the reuse of data at a transmission destination depending on information such as address information of the particular destination. When it determines that the destination is within the area of the first network N1, to which the scanner 10 is connected, so that the reuse of the data at the destination is allowed, it produces a reusable file 200 and transmits it to the particular destination. On the contrary, if it determines that the destination is outside of the area of the first network N1, so that it is not allowed to reuse the data at the destination, it produces a difficult-to-reuse file 300 and transmits it to the particular destination.

Consequently, various embodiments of the invention are capable of preventing a file from being fraudulently, and/or against the will of the file producer, edited, altered, modified, and retrieved at arbitrary transmission destinations such as equipment provided outside of the area of the network N1, to which the data transmitting source, the scanner 10, is connected.

Figure 14:
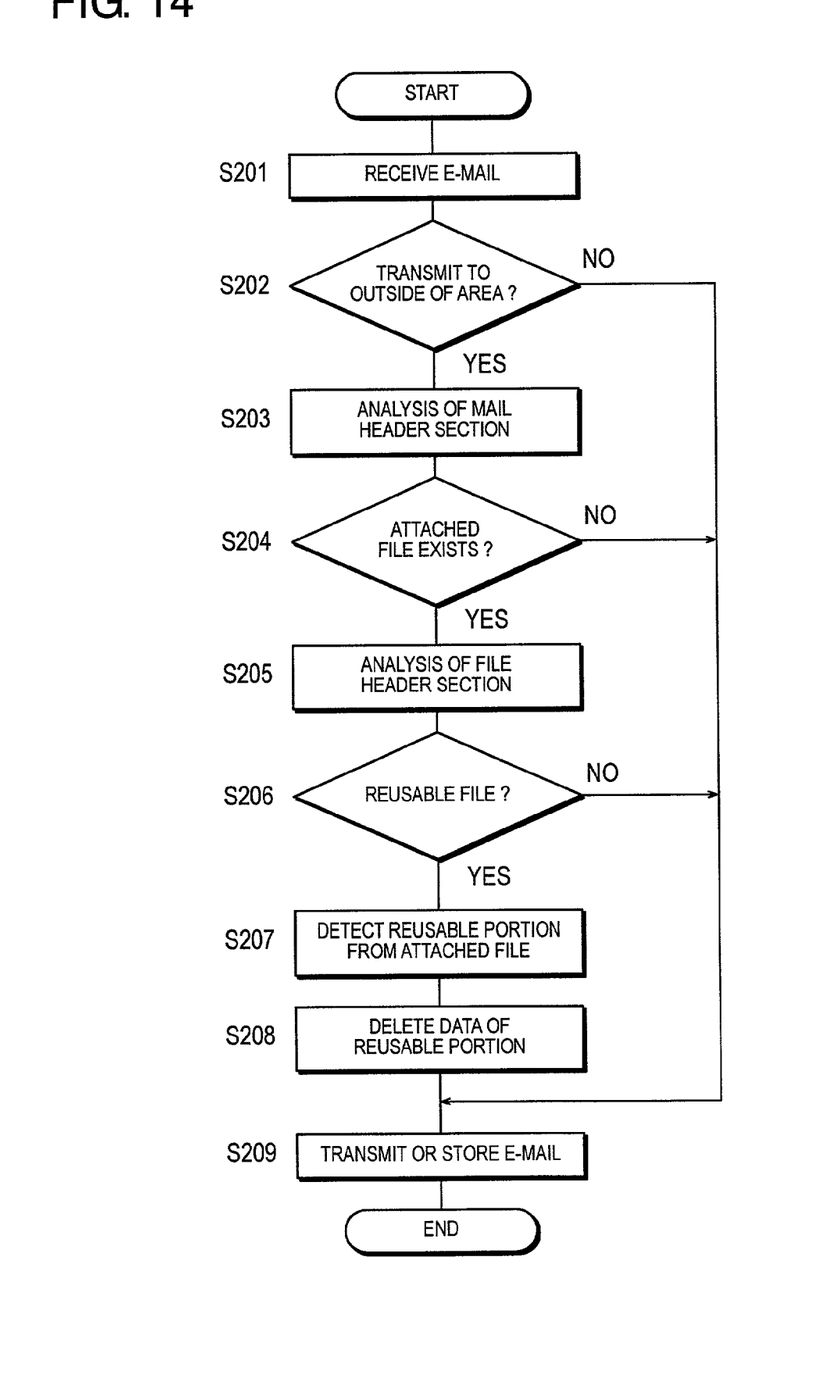
FIG. 14 is a flowchart showing the operation of a mail server capable of functioning as a data transmission management device according to the second embodiment of the invention.

FIG. 14 is a flowchart showing the operation of a mail server capable of functioning as a data transmission management device concerning the second embodiment of the present invention. The flowchart shown in FIG. 14 may be stored in the memory unit 62 of the mail server 51 as a control program and may be executed by the control unit 61.

The second embodiment of the invention is different in that its mail server 51 is capable of functioning as a data transmission management device, described above in relation to the first embodiment, in which its scanner 10 is capable of functioning as the data transmission management device. Mainly the differences between the first and second embodiments will be described and the commonality will be omitted in the following.

The second embodiment of the invention will be described by referencing the transmission of an e-mail with an attached file from user A to user B or user C.

As shown in FIG. 14, an e-mail with an attached file is received from user A in S201.

In S202, a determination is first made as to whether to allow the reuse of the data at a transmission destination depending on the nature of the particular destination. What is determined is whether the destination is within the area of the first network N1, to which the mail server 15 is connected, based on the address of the e-mail destination. In other words, the determination as to whether the reuse of the data should be allowed depends upon whether the destination is within the area of its own network from the viewpoint of the mail server 51. The above determination may be made using a table similar to the area judgment table 90 of the first embodiment as well.

If the transmission destination is outside the area of the first network N1, for example, if it is user C (S202: Yes), the process of S203 is executed. However, if the destination is within the area of the first network N1, for example, if it is user B (S202: No), the process of S209 is executed.

In S203, the header section of the e-mail is analyzed. Since the analysis is normally done in an e-mail transmission process, a detailed description is omitted.

In S204, a determination is made as to whether any file is attached to the e-mail based on the result of the analysis in S203. If a file is attached to the e-mail (S204: Yes), the process of S205 is executed; if no file is attached (S204: Yes), the process of S209 is executed.

In S205, the header section of the file attached to the e-mail is analyzed. By analyzing the header section of the file, the format of the file (e.g., PDF) can be recognized.

In S206, a determination is made as to whether the particular file is a reusable file based on the recognized file format as a result of the analysis in S205. More specifically, a determination is made as to whether the file has character code data, image data, and/or vector data as shown in FIG. 11, such that these objects can be handled individually. If a file attached to an e-mail is a reusable file (S206: Yes), the process of S207 is executed; if it is not a reusable file (S206: No), the process of S209 is executed.

In S207, reusable portions are detected from the file attached to an e-mal message. The file's link information is utilized for the detection. If the reusable file is, for example, the file 200 shown in FIG. 11, the character code data section 204, the photographic image data section 205, and/or the vector data section 206 are detected as reusable portions.

In S208, the data of the reusable portions detected in S207 is deleted. For example, in the case of the file 200 shown in FIG. 11, the data of the character code data section 204, the photographic image data section 205, and the vector data section 206 are deleted. It is also possible to reconstruct the file by deleting the character code data section 204, the photographic image data section 205, and the vector data section 206 themselves.

Consequently, the reusable file 200 is converted into the difficult-to-reuse file 300 shown in FIG. 13. Since the character code data stored in the character code data section 204 is the easiest to reuse, it is also possible to adopt a system that deletes only the data in the character code data section 204. Further, it is also possible to adopt the constitution that deletes only character code data from a file that has both character code data and image data, or deletes only vector data from a file that has both vector data and image data.

In S209, if the e-mail destination is user C, the e-mail attached with a difficult-to-reuse file is transmitted, while if the e-mail destination is user B, the received e-mail is transmitted as is to user B's mailbox at the memory unit 62 of the mail server 51.

E-mail addressed to user C is stored in the mailbox for user C in the memory unit 62 of the mail server 52. E-mail to user B and e-mail to user C are distributed to the computer of each user from the mail servers 51 and 52, respectively.

As can be seen from the above, this embodiment causes the mail server 51 to make a determination as to whether or not to allow the reuse of data at an e-mail destination based on the nature of the particular destination of the e-mail. If it determines that the reuse of the data is allowed because the destination is within the area of the first network N1 to which the mail server 51 is connected, it transmits the e-mail "as is" to the particular destination; if it determines that the reuse of the data is not allowed because the destination is outside the area of the first network N1, it converts the attached file to a difficult-to-reuse file, and the e-mail having a converted file attached thereto is transmitted to the particular destination.

Therefore, the system is able to prevent a file from being fraudulently, or against the will of the file producer, edited, altered, modified, and/or retrieved at arbitrary transmission destinations such as equipment provided outside of the area of the network N1, to which the mail server 51 is connected.

Although an embodiment of the invention was described from the viewpoint of assuredness and ease of management, in which the mail server that receives e-mail transmitted by the user is able to function as a data transmission management device, it is also possible to let the mail server that distributes e-mail to the user have the same function as the data transmission management device.

Figure 15:
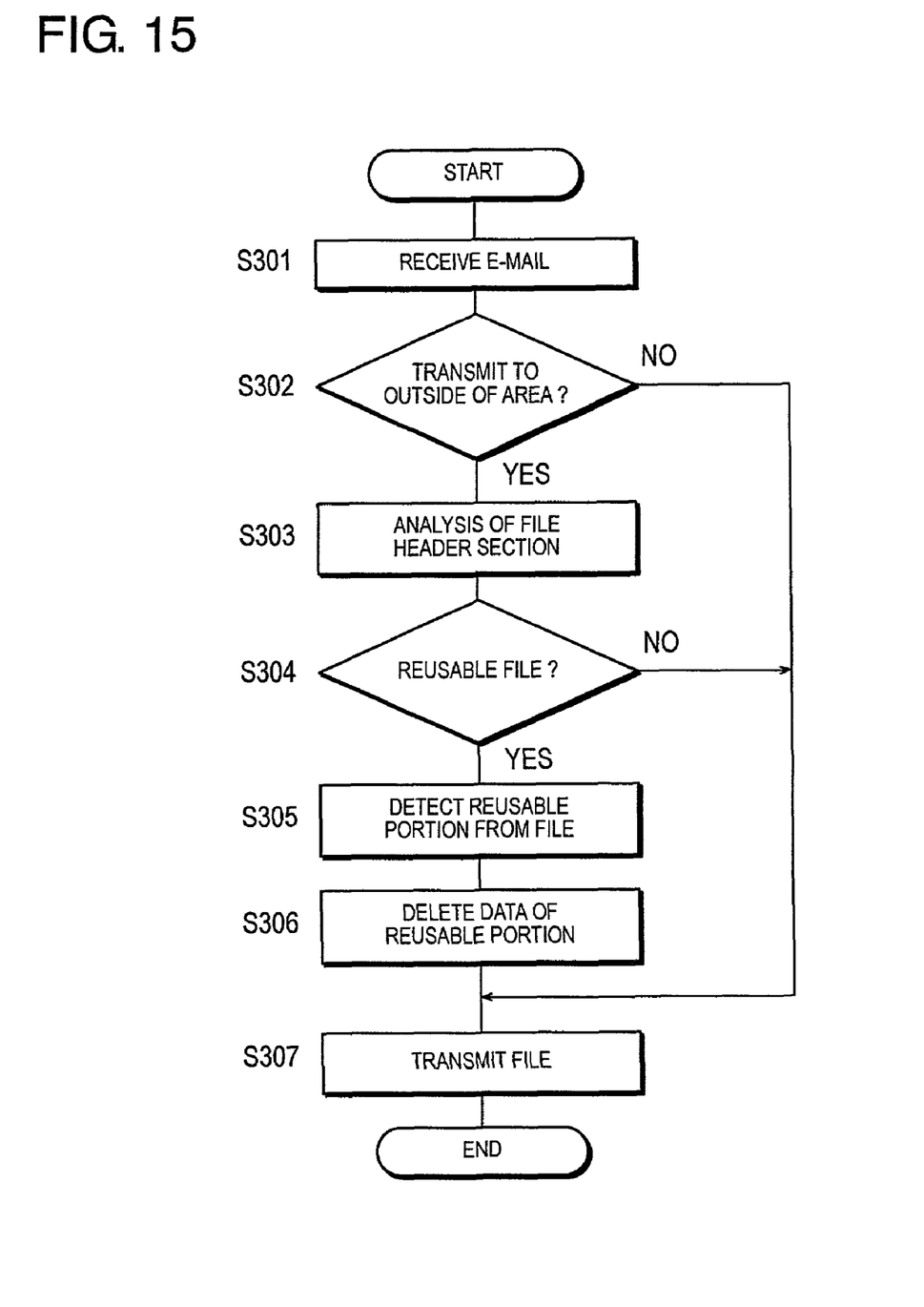
FIG. 15 is a flowchart showing the operation of a relaying device capable of functioning as a data transmission management device according to the third embodiment of the present invention.

FIG. 15 is a flowchart showing the operation of a relaying device that is capable of functioning as a data transmission management device according to a third embodiment of the invention. The flowchart shown in FIG. 15 may be stored in the memory 82 of the relaying device 70 as a control program and may be executed by the control unit 81.

The third embodiment is different from the first embodiment in that the relaying device 70 is capable of functioning as a data transmission management device in the former, while the scanner 10 functions as a data transmission management device in the latter. For the most part, the differences between the first and third embodiments will be described and the commonality will be omitted in the following.

A case of sending a file from user A to user B or to user C will be described. The file transmission is executed according to the specified transfer protocol such as FTP (file transfer protocol).

As shown in FIG. 15, the file is received from user A in S301.

In S302, a determination is made as to whether to allow the reuse of the data at a transmission destination based on the nature of the particular destination of the file. What is determined is whether or not the destination is within the area of the first network N1, to which the computer 31 of user A, who is the transmitting source, is connected, based on the address of the file destination. In other words, the determination as to whether the reuse of the data should be allowed depends on whether the destination is within the area of its own network from the viewpoint of the computer 31 of the transmitting source. The above determination may be made using a table similar to the area judgment table 90 of the first embodiment as well.

If the destination is outside the area of the first network N1, for example, if it is user C (S302: Yes), the process of S303 is executed; if the destination is within the area of the first network N1, for example, if it is user B (S302: No), the process of S307 is executed.

In S303, the header section of the file is analyzed. By analyzing the file's header section, the file type (e.g., PDF) can be determined.

In S304, a determination is made as to whether or not the file is a reusable file based on the recognized file format resulting from the analysis in S303. More specifically, a determination is made as to whether or not the file has character code data, image data, and/or vector data as shown in FIG. 11 as objects that can be handled individually. If a file is a reusable file (S304: Yes), the process of S305 is executed; if it is not a reusable file (S304: No), the process of S307 is executed.

In S305, reusable portions of the file are detected. The file's link information is utilized for the detection. If the reusable file is, for example, a file such as file 200 shown in FIG. 11, the character code data section 204, the photographic image data section 205, and the vector data section 206 are detected as reusable portions.

In S306, the data of the reusable portions detected in S305 is deleted. For example, in the case of the file 200 shown in FIG. 11, the data of the character code data section 204, the photographic image data section 205, and the vector data section 206 are deleted. Moreover, it is possible to reconstruct the file by deleting the character code data section 204, the photographic image data section 205, and the vector data section 206 themselves.

Consequently, the reusable file 200 is converted into the difficult-to-reuse file 300 shown in FIG. 13. Since the character code data stored in the character code data section 204 is the easiest to reuse, it is also possible to adopt a system that deletes only the data in the character code data section 204. Further, it is also possible to adopt a system that deletes only character code data from a file that has both character code data and image data, or deletes only vector data from a file that has both vector data and image data.

In S307, if the file transmission destination is the computer 33 of user C, a difficult-to-reuse file is transmitted, while if the file destination is the computer 32 of user B, the received file is transmitted "as is" to the first network N1.

As can be seen from the above, this embodiment causes the relaying device 70 to make a determination as to whether or not to allow the reuse of data at a destination based on the nature of the particular destination of the file. If it determines that the reuse of the data is allowed because the destination is within the area of the first network N1 to which the computer 31 of the transmitting source is connected, it transmits the file "as is" to the particular destination. If it determines that the reuse of the data is not allowed because the destination is outside the area of the first network N1, it converts the file to a difficult-to-reuse file, and the converted file is transmitted to the particular destination.

Therefore, various embodiments of the invention are capable of preventing a file from being fraudulently, or against the will of the file producer, edited, altered, modified, and retrieved at arbitrary transmission destinations such as equipment provided outside of the area of the network N1, to which the computer 31 of the transmitting source is connected.

The invention is not limited to the embodiments described above, but rather can be modified in various ways within the scope of the claims.

For example, although an embodiment of the invention was described in which the determination as to whether or not to allow the reuse of the data at the destination is made based on whether the destination is on the first network N1 or the second network N2, the invention is not limited to such an embodiment. Instead, a system can be configured in such a way that there are more than three networks in the system and that the determination related to the reuse of the data at the destination is made based on whether the destination is on at least one of the specified networks. It is also possible to configure a system in such a way that the determination regarding the reuse of data at the destination is made based on whether the destination is a particular device identified by an address, etc., regardless of the network to which it belongs.

Moreover, although the first through the third embodiments were described as independent of each other in the above descriptions, the invention can be implemented by combining the first through the third embodiments arbitrarily.

Various means of controlling and arithmetic operations in the data transmission management device as well as a data transmission management method according to this invention may be realized using either a dedicated hardware circuit or a programmed computer. In realizing the present invention with a programmed computer, the program for operating the computer can be provided in computer readable recording media (e.g., flexible disks and CD-ROMs). In such a case, the program recorded on a computer readable medium is normally transferred to and recorded on a hard disk. This program can be provided, for example, independently as application software, or can be built into the software of the computer as a part of the computer's function. The computer program product in this invention includes the computer program itself as well as the computer readable recording media on which the computer program is stored.

What is claimed is:

1. A data transmission management device for managing a data transmission process via a network, comprising:
   an input device to input image data to be transmitted;
   a judgment unit to approve reuse of the data at a transmission destination based on a nature of the transmission destination of said data; and
   a data adjuster to adjust the data to be transmitted to said destination based on an approval of said judgment unit,
   wherein the data adjuster produces a reusable data file from the data, the reusable data file comprising multiple sets of data representing objects within the data, wherein the multiple sets of data within the reusable data file are parseable to be handled independently from one another at the transmission destination, when reuse of the data is approved, and
   the data adjuster produces a difficult-to-reuse data file from the data, the difficult-to-reuse data file comprising image data representing a graphical image of all the objects within the data to be transmitted, when reuse of the data is not approved.

2. The data transmission management device as claimed in claim 1, wherein said judgment unit judges that the reuse of the data at said transmission destination is approved if a domain name of an e-mail address of a transmission source matches with that of the transmission destination of the data.

3. The data transmission management device as claimed in claim 1, wherein said judgment unit judges that the reuse of the data at said transmission destination is approved if a specified part of an IP address of a transmission source matches with that of the transmission destination of the data.

4. The data transmission management device as claimed in claim 1, wherein said input device is an image reading device for obtaining image data where images are expressed as an assembly of pixels by scanning a document.

5. The data transmission management device as claimed in claim 4, further comprising:
   a character code data producer to produce character code data where characters are expressed as codes based on character images in said image data,
   wherein said reusable data file comprises said character code data if it is judged by said judgment unit that the reuse of the data at the transmission destination is approved.

6. The data transmission management device as claimed in claim 5, further comprising:
   a vector data producer to produce vector data where graphics are expressed as coordinates of graphic components based on graphic images in said image data,
   wherein reusable data file comprises said character code data and said vector data if it is judged by said judgment unit that the reuse of the data at the transmission destination is approved.

7. The data transmission management device as claimed in claim 1,
   wherein said data is a file having a character code data where characters are expressed as codes, and an image data where images are expressed in an assembly of pixels, each as objects that can be handled independently, and
   wherein said data adjuster is configured to delete said character code data from said file to obtain said difficult-to-reuse data file if it is judged by said judgment unit that the reuse of the data at the transmission destination is disapproved.

8. The data transmission management device as claimed in claim 1,
wherein said data is a file having a vector data where graphics are expressed as coordinates of graphic components, and an image data where images are expressed in an assembly of pixels, each as objects that can be handled independently, and
wherein said data adjuster configured to delete said vector data from said file to obtain said difficult-to-reuse data file if it is judged by said judgment unit that the reuse of the data at the transmission destination is disapproved.

9. The data transmission management device as claimed in claim 1, wherein said input device is a network interface for obtaining image data via a network.

10. The data transmission management device of claim 1, wherein the multiple sets of data representing objects within the data have different formats.

11. A data transmission management method for managing data transmission process via a network, comprising:
obtaining data to be transmitted;
judging whether to approve reuse of data at a transmission destination based on a nature of the transmission destination of said data; and
adjusting the data to be transmitted to said destination based on an approval of said judgment unit,
wherein the adjusting step comprises producing a reusable data file, the reusable data file comprising multiple sets of data representing objects within the data, wherein the multiple sets of data within the reusable data file are parseable to be handled independently from one another at the transmission destination, when reuse of the data is approved, and
the adjusting step comprises producing a difficult-to-reuse data file, the difficult-to-reuse data file comprising image data representing a graphical image of all the objects within the data to be transmitted, when reuse of the data is not approved, wherein at least one of the steps are performed by a computer processor.

12. The data transmission management method of claim 11, wherein the multiple sets of data representing objects within the data have different formats.

13. A program product for managing a data transmission process via a network, wherein said program product includes program code which causes a computer to execute a process, comprising:
obtaining data to be transmitted;
judging whether to approve reuse of data at a transmission destination based on a nature of the transmission destination of said data; and
adjusting the data to be transmitted to said destination based on an approval of said judgment unit,
wherein the adjusting step comprises producing a reusable data file, the reusable data file comprising multiple sets of data representing objects within the data, wherein the multiple sets of data within the reusable data file are parseable to be handled independently from one another at the transmission destination, when reuse of the data is approved, and
the adjusting step comprises producing a difficult-to-reuse data file, the difficult-to-reuse data file comprising image data representing a graphical image of all the objects within the data to be transmitted, when reuse of the data is not approved, wherein said program product is a non-transitory computer readable recording medium on which a computer program is stored.

14. The program product of claim 13, wherein the multiple sets of data representing objects within the data have different formats.

15. A data transmission management method for managing data transmission process via a network, comprising:
obtaining data to be transmitted;
judging whether said data's transmission destination is within a network from which the data is to be transmitted; and
producing a reusable data file to be transmitted to said destination, the reusable data file comprising multiple kinds of codes represented by multiple sets of data representing objects within the data, wherein the multiple sets of data within the reusable data file are parseable to be handled independently from one another at the transmission destination, when the data's transmission destination is from within the network from which the data is to be transmitted, and
producing a difficult-to-reuse data file to be transmitted to said destination, the difficult-to-reuse data file including a single kind of code represented by a graphical image of all the objects within the data to be transmitted, when the data's transmission destination is not from within the network from which the data is to be transmitted, wherein at least one of the steps are performed by a computer processor.

16. The data transmission management method of claim 15, wherein the multiple sets of data representing objects within the data have different formats.

17. A data transmission management device for managing data transmission process via a network, comprising:
an input device configured to input data to be transmitted; and
a controller configured to approve reuse of data at a transmission destination based on a nature of a transmission destination of said data, and configured to adjust the data to be transmitted to said destination to produce a reusable data file comprising multiple sets of data representing objects within the data, wherein the multiple sets of data within the reusable data file are parseable to be handled independently from one another at the transmission destination, when reuse of the data is approved, and to adjust the data to produce a difficult-to-reuse data file comprising image data representing a graphical image of all the objects within the data to be transmitted, when reuse of the data is not approved.

18. The data transmission management device of claim 17, wherein the multiple sets of data representing objects within the data have different formats.

* * * * *